(12) United States Patent
Kvache et al.

(10) Patent No.: US 7,499,529 B1
(45) Date of Patent: Mar. 3, 2009

(54) SYSTEMS AND METHODS FOR PROVIDING FILTERED MESSAGE DELIVERY

(75) Inventors: Alexander Kvache, Waltham, MA (US); Michael Weintraub, Medfield, MA (US)

(73) Assignee: Verizon Laboratories, Inc., Waltham, MA (US)

( * ) Notice: Subject to any disclaimer, the term of this patent is extended or adjusted under 35 U.S.C. 154(b) by 158 days.

(21) Appl. No.: 10/016,551

(22) Filed: Dec. 11, 2001

(51) Int. Cl.
*H04M 1/64* (2006.01)

(52) U.S. Cl. ............ 379/88.22; 379/88.23; 379/201.03; 379/209.01; 709/206

(58) Field of Classification Search .............. 379/88.14, 379/374.02, 88.12, 67.1, 93.15, 88.13, 209.01, 379/201.03, 88.22, 88.23; 709/206, 246, 709/232; 707/1; 342/357.17; 705/9; 455/552.1; 370/265; 726/4, 13
See application file for complete search history.

(56) References Cited

U.S. PATENT DOCUMENTS

| | | | |
|---|---|---|---|
| 5,608,786 A | | 3/1997 | Gordon ..................... 379/100 |
| 5,659,599 A | * | 8/1997 | Arumainayagam et al. 379/67.1 |
| 5,802,314 A | * | 9/1998 | Tullis et al. ................ 709/246 |
| 5,870,454 A | * | 2/1999 | Dahlen ..................... 379/88.14 |
| 5,987,100 A | * | 11/1999 | Fortman et al. ........... 379/88.14 |
| 6,092,114 A | * | 7/2000 | Shaffer et al. .............. 709/232 |
| 6,138,146 A | | 10/2000 | Moon et al. ................ 709/206 |
| 6,147,977 A | * | 11/2000 | Thro et al. ................. 370/265 |
| 6,212,265 B1 | | 4/2001 | Duphorne ................. 379/142 |
| 6,373,926 B1 | * | 4/2002 | Foladare et al. ........... 379/88.13 |
| 6,411,684 B1 | * | 6/2002 | Cohn et al. ............... 379/88.14 |
| 6,442,242 B1 | * | 8/2002 | McAllister et al. ......... 379/67.1 |
| 6,493,427 B1 | * | 12/2002 | Kobylevsky et al. ....... 379/67.1 |
| 6,621,892 B1 | * | 9/2003 | Banister et al. ........... 379/88.14 |
| 6,654,448 B1 | * | 11/2003 | Agraharam et al. ...... 379/88.14 |
| 6,779,020 B1 | * | 8/2004 | Henrick ..................... 709/206 |
| 6,944,273 B2 | * | 9/2005 | Huna ....................... 379/88.14 |
| 7,325,249 B2 | * | 1/2008 | Sutton et al. .................. 726/13 |
| 2002/0007400 A1 | * | 1/2002 | Pedersen .................... 709/206 |
| 2002/0052218 A1 | * | 5/2002 | Rhee ......................... 455/552 |
| 2002/0067806 A1 | * | 6/2002 | Rodriguez et al. ....... 379/88.12 |
| 2002/0120600 A1 | * | 8/2002 | Schiavone et al. ............. 707/1 |
| 2003/0028604 A1 | * | 2/2003 | Aktas et al. ................. 709/206 |

OTHER PUBLICATIONS

Messaging Server Plug-in API Guide; Messaging Server 4.1; May 1999; http://docs.iplanet.com/docs/mauals/messaging/nms41/api/contents.htm,63 pages.
Irving De la Cruz; Inside MAPI; Microsoft Press, ISBN; Jan. 2001, pp. 106-107.
David H. Crocker; RFC 822: Standard for ARPA Internet Text Messages; Aug. 1982, 40 pages.
J. Myers et al.; RFC 1939; Post Office Protocol-Version 3; May 1996, 18 pages.

(Continued)

*Primary Examiner*—Md S Elahee

(57) ABSTRACT

A system (140) that delivers messages receives a message intended for the receiving party. The system (140) determines whether the message should be delivered to the receiving party and converts the message to an audible message when the message should be delivered to the receiving party. The system (140) then initiates a telephony call to the receiving party and delivers the audible message to the receiving party during the telephony call.

48 Claims, 10 Drawing Sheets

OTHER PUBLICATIONS

N. Freed et al.; RFC 2045; Multipurpose Internet Mail Extensions (MIME) Part One's Format of Internet Message Bodies; Nov. 1996, 25 pages.

N. Freed et al.; RFC 2046; Multipurpose Internet Mail Extensions (MIME) Part Two's Format of Media Types; Nov. 1996, 35 pages.

K. Moore; RFC 2047; Multipurpose Internet Mail Extensions (MIME) Part Three's Format of Message Header Extensions for Non-ASCII Text; Nov. 1996, 12 pages.

N. Freed et al.; RFC 2048; Multipurpose Internet Mail Extensions (MIME) Part Four's Format of Registration Procedures; Nov. 1996, 16 pages.

N. Free et al.; RFC 2049; Multipurpose Internet Mail Extensions (MIME) Part Five's Format of Conformance Criteria and Examples; Nov. 1996, 19 pages.

M. Crispin; RFC 2060; Internet Message Access Protocol-Version 4rev1; Dec. 1996, 64 pages.

Jonathan B. Postel; RFC 821; Simple Mail Transfer Protocol; Aug. 1982, 45 pages.

Copytalk—Learn More, The Affordable Personal Assistant, https://www.copytalk.com/TOPLEVELPAGES/learnmore.htm, 10 pages, printed Oct. 17, 2003.

The All-In-One Communications Service; ureach.com; Dec. 1999; 5 pages.

The All-In-One Communications Service; ureach.com; Nov. 1999; 11 pages.

* cited by examiner

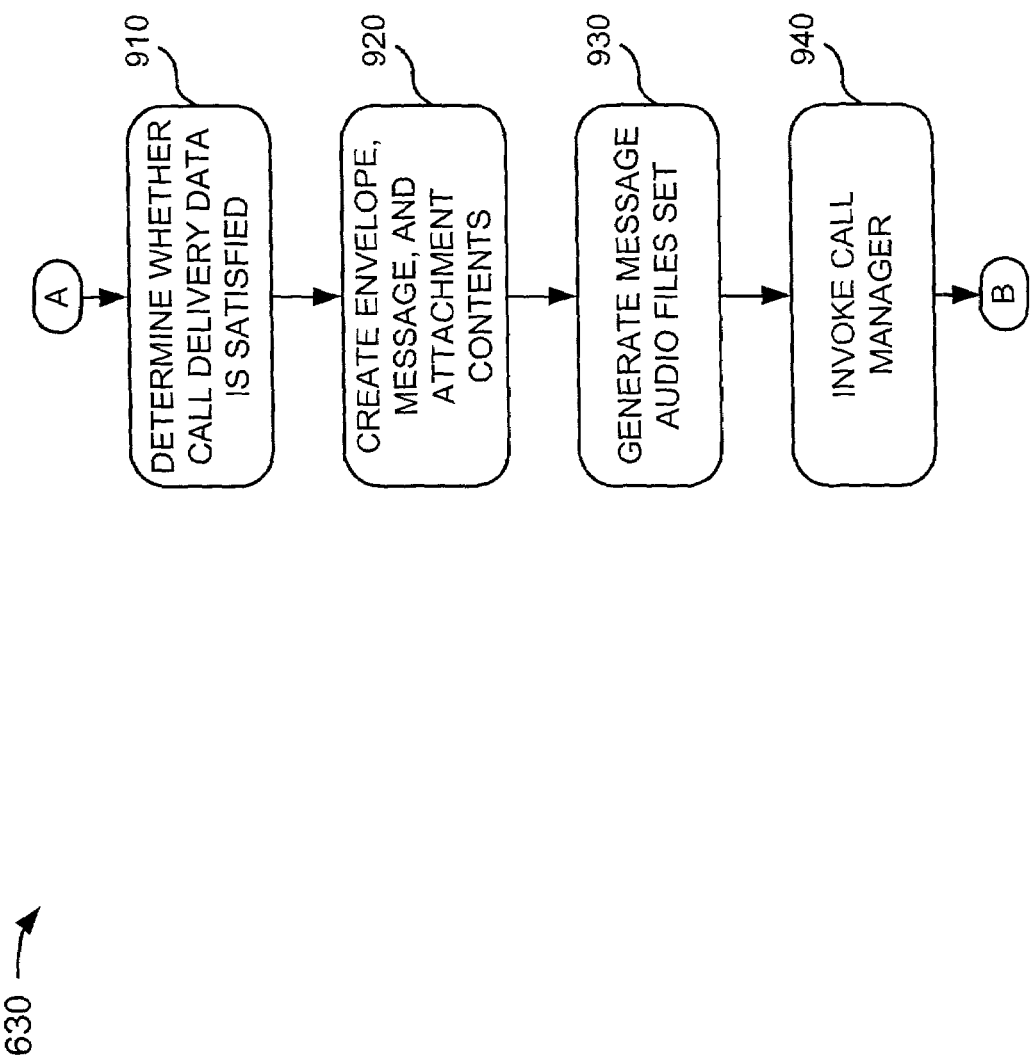

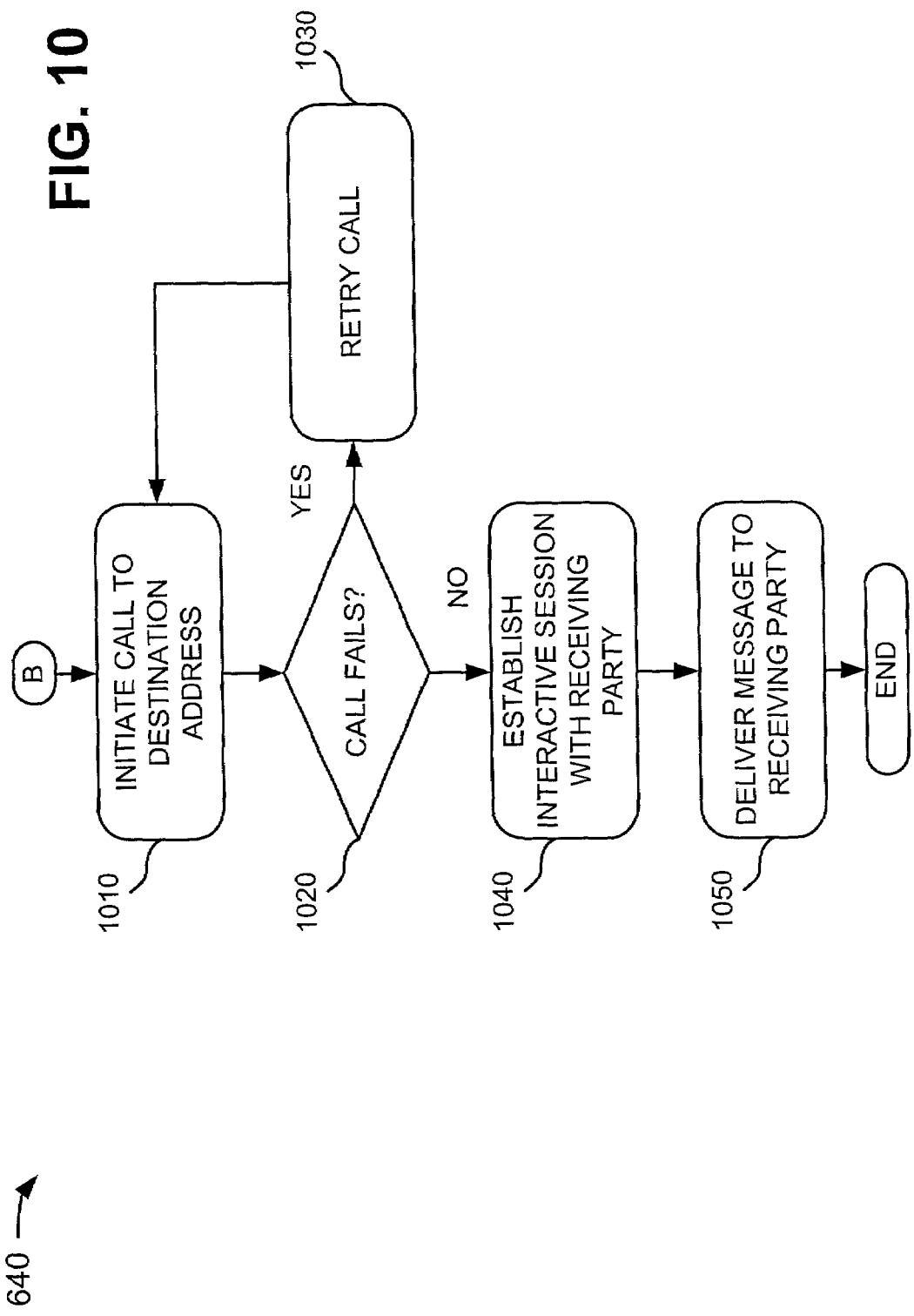

SYSTEMS AND METHODS FOR PROVIDING FILTERED MESSAGE DELIVERY

BACKGROUND OF THE INVENTION

1. Field of the Invention

The present invention relates generally to message delivery and, more particularly, to systems and methods that provide filtered message delivery based on user-defined criteria.

2. Description of Related Art

Today, many types of mechanisms exist to allow people to communicate. These mechanisms include voice calls, e-mail, facsimiles, and other types of direct and indirect messaging. When the receiving party is unavailable, the sending party must typically leave a message with a mailbox of a dedicated or unified messaging system.

In order for the receiving party to determine whether any new messages exist in the mailbox, the receiving party usually must query the messaging system using a communication device, such as a computer or telephone. To accomplish prompt and effective delivery of the new message, the receiving party must establish a network connection by, for example, connecting to the Internet or dialing a specified telephone number.

Recently, several systems have been developed to notify the receiving party that a new message has been deposited in his or her mailbox. These systems sometimes involve the use of pagers, short message service (SMS), and caller ID technologies. After receiving the notification, the receiving party must still initiate a network connection or telephone call to the messaging system in order to retrieve the full message.

These conventional systems have a number of drawbacks. For example, the systems require that the receiving party have a special-purpose device with specific non-voice oriented capabilities, such as a pager or caller ID device.

Also, the systems do not differentiate between messages. In other words, the systems treat all messages similarly, whether the messages are high or low priority or from important or unimportant sending parties.

Further, the systems require the receiving party to initiate a network connection or telephone call to retrieve the messages without knowledge of the content of the messages. This is particularly true where a message includes an attachment, such as an audio, video, or image file.

Therefore, there exists a need for systems and methods that provide notifications of certain messages, including message attachments, to a receiving party without requiring that the receiving party have any special-purpose device with non-voice oriented capabilities.

SUMMARY OF THE INVENTION

Systems and methods consistent with the present invention address this and other needs by permitting receiving parties to define message notification preferences that identify the types of messages for which message notifications are to be provided to the receiving parties. The message notifications may audibly describe the contents of the messages, including any attachments. The receiving parties may receive the message notifications using a standard telephony device, such as a telephone.

In accordance with the principles of the invention as embodied and broadly described herein, a system that delivers messages to a receiving party is provided. The system receives a message intended for the receiving party and determines whether the message should be delivered to the receiving party. If the message should be delivered to the receiving party, the system converts the message to an audible message. The system then initiates a telephony call to the receiving party and delivers the audible message to the receiving party during the telephony call.

In another implementation consistent with the present invention, a message delivery system is provided. The message delivery system includes a message receiver and a call processor. The message receiver is configured to obtain a message intended for a receiving party, determine whether the message should be delivered to the receiving party, and convert the message from a source format to a target format when the message should be delivered to the receiving party. The call processor is configured to convert the message from the target format to an audible format, initiate a telephony call to the receiving party, and deliver the message in the audible format to the receiving party during the telephony call.

In yet another implementation consistent with the present invention, a computer-readable medium that stores instructions executable by at least one computer to perform a method for presenting a message to a receiving party is provided. The computer-readable medium includes instructions for obtaining a message intended for the receiving party; instructions for obtaining a user profile that describes at least one criterion indicating when messages should be delivered to the receiving party; instructions for initiating a telephony call to the receiving party when the at least one criterion in the user profile indicates that the message should be delivered to the receiving party; and instructions for presenting the message to the receiving party during the telephony call.

In a further implementation consistent with the present invention, a method for providing enhanced message services is provided. The method includes interacting with a user to generate a user profile that identifies at least one message criterion that describes when messages should be delivered to the user; monitoring a message server for arrival of new messages intended for the user; processing the new messages, including determining whether the new messages should be delivered to the user based on the user profile and converting the new messages into audible messages when the new messages should be delivered to the user; and delivering the audible messages to the user, including initiating a telephony call to the user, and presenting the audible messages to the user during the telephony call.

In another implementation consistent with the present invention, an automated method for delivering a message to a receiving party is provided. The method includes receiving a message intended for the receiving party; converting the message to an audible message; initiating a telephony call to a telephony device associated with the receiving party; and delivering the audible message to the receiving party during the telephony call.

BRIEF DESCRIPTION OF THE DRAWINGS

The accompanying drawings, which are incorporated in and constitute a part of this specification, illustrate the invention and, together with the description, explain the invention. In the drawings.

FIG. 9 is a flowchart of exemplary processing by message delivery system of FIG. 2 during the processing phase according to an implementation consistent with the present invention; and FIG. 10 is a flowchart of exemplary processing by message delivery system of FIG. 2 during the delivery phase according to an implementation consistent with the present invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

For purposes of the description to follow, a "sending party" is a party who initiates a message transmission (voice, e-mail, facsimile, etc.) and a "receiving party" is the party to which the message from the sending party is intended. The receiving party also includes a party who has subscribed or registered for message-related services consistent with the present invention. This party may alternatively be referred to as a "user." While only a single sending party and receiving party will be described, systems and methods consistent with the present invention may be used with multiple sending parties and/or receiving parties.

Systems and methods consistent with the present invention provide enhanced message services by delivering a message via a telephony call to a standard telephony device when the message arrives in a receiving party's mailbox. Prior to delivery, each message is screened based on a user-defined profile to determine whether the message is to be delivered to the receiving party. The user profile defines the message screening criteria. For example, a message might be screened based on its "From" field, "Subject" field, or the contents of the message body. A message might also be screened based on the time at which the message arrived at the mailbox.

Exemplary System Configuration

Figure 1:
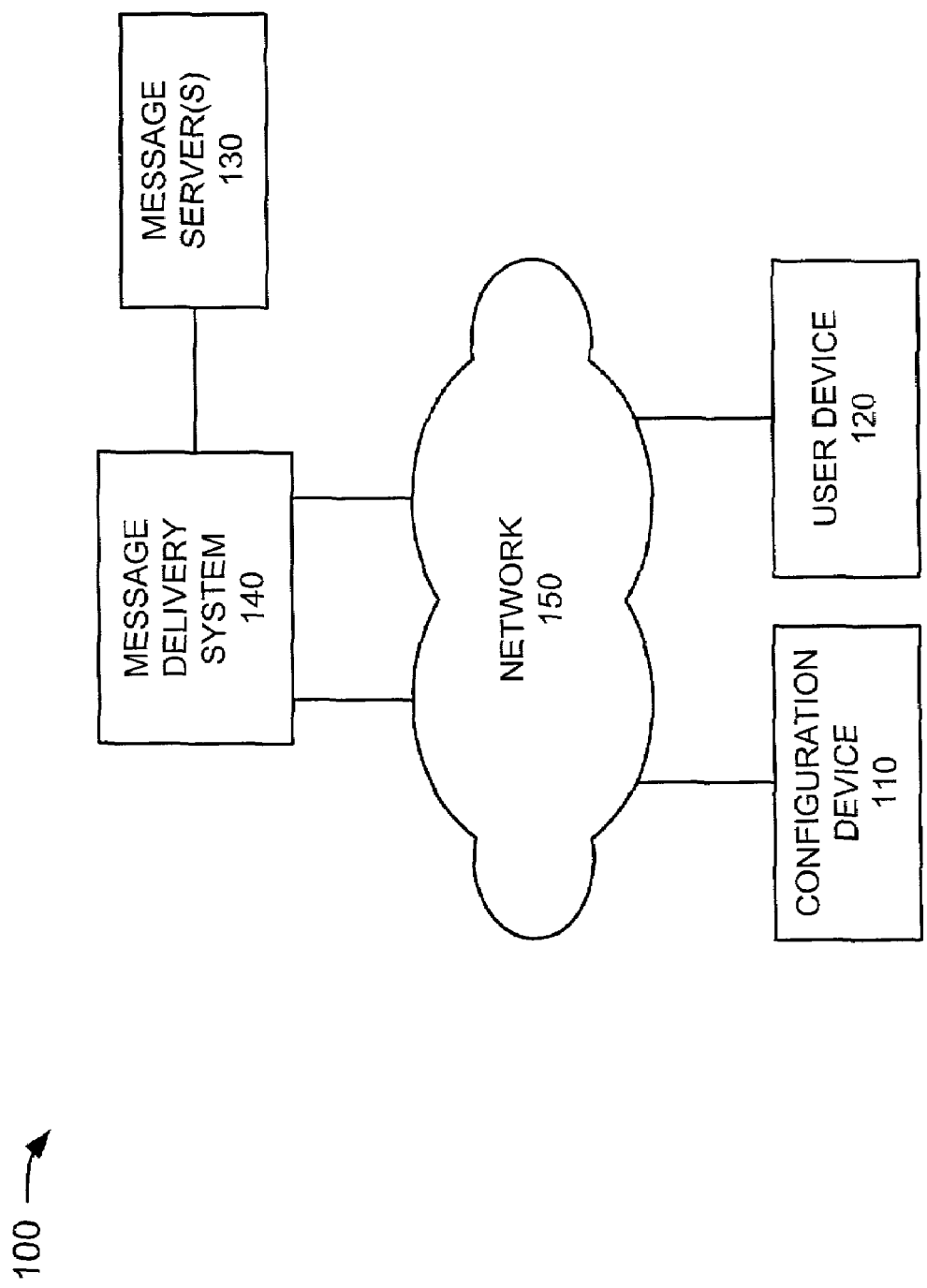
FIG. 1 is an exemplary diagram of a system in which systems and methods consistent with the present invention may be implemented.

FIG. 1 is an exemplary diagram of a system 100 in which systems and methods consistent with the present invention may be implemented. The system 100 may include configuration device 110, user device 120, message server(s) 130, and message delivery system 140 connected via a network 150. Network 150 may include one or more networks, such as the Internet, an intranet, a local area network (LAN), a wide area network (WAN), or the Public Switched Telephone Network (PSTN).

Configuration device 110 may include a conventional communication device, such as a wireline or wireless telephone, a computer, or a personal digital assistant (PDA), capable of communicating with message delivery system 140 over network 150. User device 120 may include a conventional telephony device, such as a wireline or wireless telephone, a computer, or a PDA, capable of receiving a telephony call over network 150. In some cases, configuration device 110 and user device 120 may be the same device.

Message server(s) 130 may include one or more conventional messaging systems connected to message delivery system 140. While FIG. 1 shows a direct connection between message server(s) 130 and message system 140, this connection may be indirect, such as through a network (e.g., network 150).

Message server(s) 130 may maintain mailboxes for one or more types of messages destined for receiving parties. The receiving parties typically register or subscribe to the messaging services provided by message server(s) 130. Each message server 130 operates independently based on its specific architecture and interfaces. For example, a Netscape message server has a plug-in architecture that allows it to process messages immediately after its Simple Mail Transfer Protocol (SMTP) message transfer agent (MTA) receives them. A Microsoft Exchange server, on the other hand, supports a messaging application programming interface (MAPI), which provides a component object model (COM)-based notification engine.

Figure 2:
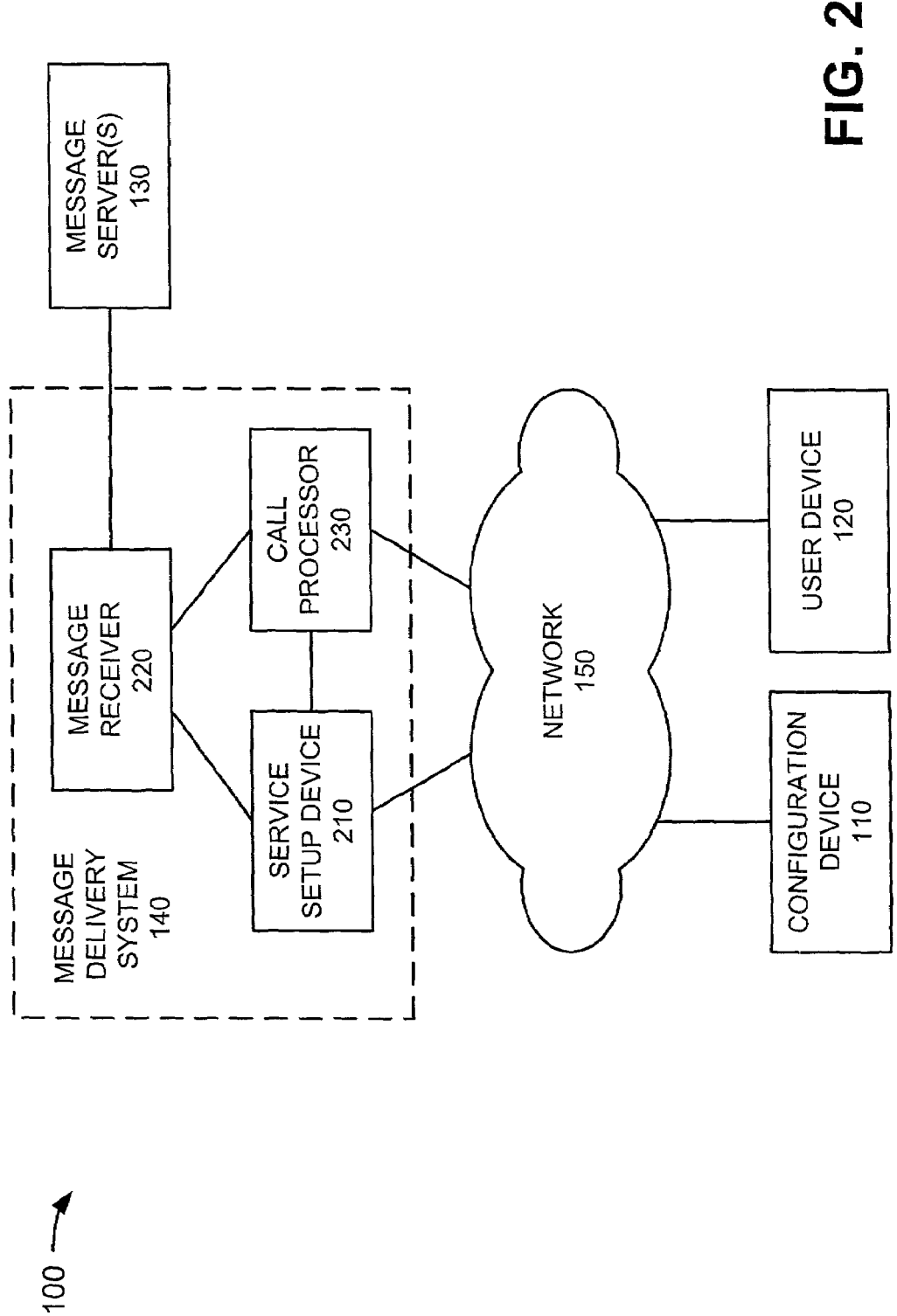
FIG. 2 is an exemplary detailed diagram of the message delivery system of FIG. 1 according to an implementation consistent with the present invention.
Figure 3:
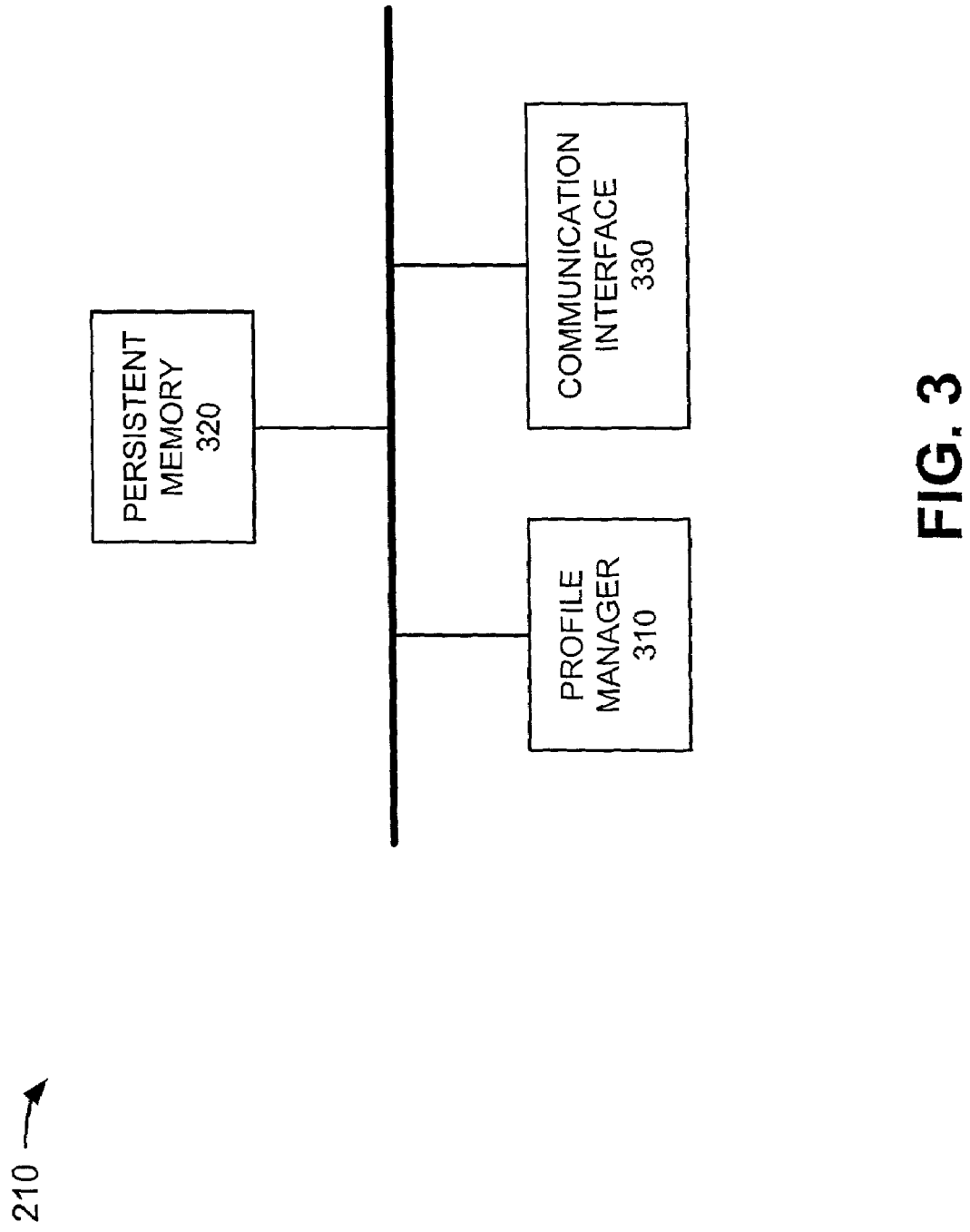
FIG. 3 is an exemplary functional block diagram of the service setup device of FIG. 2 according to an implementation consistent with the present invention.

Message delivery system 140 may provide enhanced message delivery services for messages stored in the mailboxes maintained by message server(s) 130. FIG. 2 is an exemplary detailed diagram of message delivery system 140 according to an implementation consistent with the present invention. Message delivery system 140 may include service setup device 210, message receiver 220, and call processor 230. While service setup device 210, message receiver 220, and call processor 230 are shown as separate devices, they may be integrated within a single device in other implementations consistent with the present invention. Service setup device 210 may include a computer or a similar device that is responsible for managing a user's profile. FIG. 3 is an exemplary functional block diagram of service setup device 210 according to an implementation consistent with the present invention. Service setup device 210 may include profile manager 310, persistent memory 320, and communication interface 330. Profile manager 310 may include logic that communicates with configuration device 110 to establish and maintain a user's profile.

The user profile may include user-defined criteria that indicates how messages are to be processed by message delivery system 140. For example, the user may specify that a message notification should be generated for messages based on certain data associated with the messages, such as data indicating the message source, subject data, message text, message priority, message type, date and time interval of message arrival, etc. The user may, for example, specify that messages that are marked with a certain priority (e.g., urgent messages), originate from a particular sending party (e.g., messages from John Smith), and/or arrive during a specified time interval (e.g., messages that arrive between 11:30 a.m. and 2:00 p.m. on Monday through Friday) are messages for which message notifications should be generated.

Also, the user may specify the manner by which message notification is to occur. For example, the user may identify the minimal number of messages to deliver in one call, the date and time to call, the telephone number to call, and the number of retries, the retry interval, and/or alternate telephone numbers to try if the call fails (e.g., the line is busy, the call is not answered, or the call is answered by a voice storage device).

Persistent memory 320 may include a relational database, a lightweight directory access protocol (LDAP) directory, or another type of computer-readable medium. A computer-readable medium may include one or more memory devices and/or carrier waves. Profile manager 310 may store user profile data in persistent memory 320 and provide such data upon request to message receiver 220 and/or call processor 230.

Communication interface 330 may include any transceiver-like mechanism that enables service setup device 210 to communicate with other devices and/or systems. For example, communication interface 330 may include mechanisms for communicating with another device or system, such as message receiver 220, call processor 230, and/or configuration device 110, via a direct or network connection.

Returning to FIG. 2, message receiver 220 may include a computer or a similar device that is capable of receiving and processing different types of messages, such as e-mail, voice mail, and facsimile messages. Message receiver 220 may interact with message server(s) 130 to process messages based on the user-defined criteria specified in the user profile maintained by service setup device 210.

To perform its functions, message receiver 220 may operate in two distinct modes: a polling mode and an event-driven mode. The particular mode may be determined by software or may be based on the particular type of message server 130 with which message delivery system 140 is communicating on behalf of a particular user.

In the polling mode, message receiver 220 may query message server(s) 130 for the existence of new messages that meet the user-defined criteria identified in the user profile. Any messages that have arrived at message server(s) 130 since the last polling may be processed according to the user-defined criteria. An advantage of the polling mode is that it works with every type of message server 130 that supports standard Internet messaging protocols.

In the event-driven mode, the arrival of each new message into a receiving party's mailbox within message server(s) 130 triggers the process of evaluating the message against the user-defined criteria in the user profile. An advantage of the event-based mode is that it generates significantly less network traffic than the polling mode.

Figure 4:
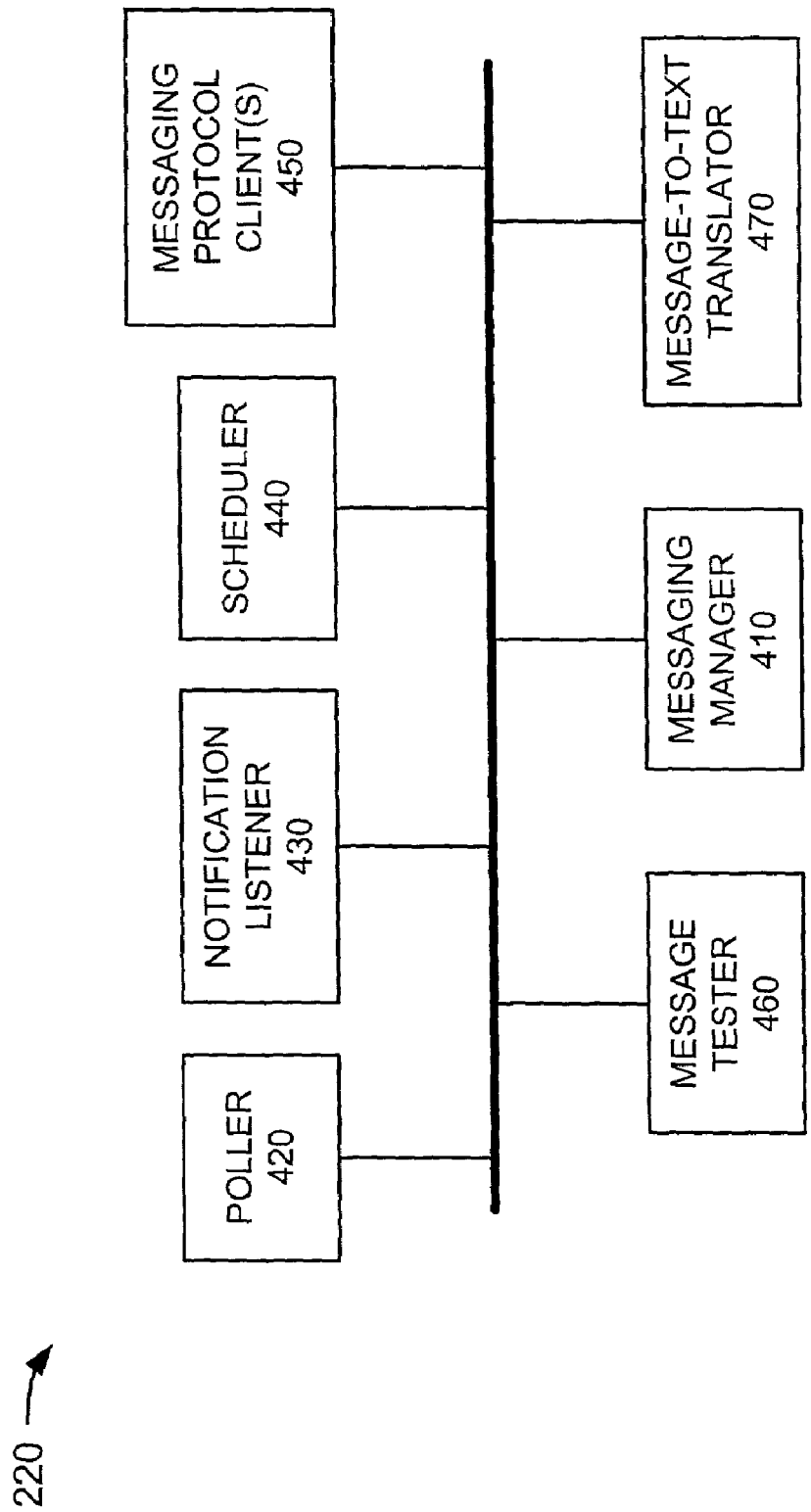
FIG. 4 is an exemplary functional block diagram of the message receiver of FIG. 2 according to an implementation consistent with the present invention.

FIG. 4 is an exemplary functional block diagram of message receiver 220 according to an implementation consistent with the present invention. Message receiver 220 may include messaging manager 410, poller 420, notification listener 430, scheduler 440, messaging protocol client(s) 450, message tester 460, and message-to-text translator 470.

Messaging manager 410 may include a high-level control component that integrates the activities of the other components. Poller 420 may include logic that operates within the polling mode and interacts with message server(s) 130 to request information on a scheduled basis. Poller 420 may periodically poll message server(s) 130 to determine whether one or more new messages exist that warrant processing.

Notification listener 430 may include logic that operates within the event-driven mode and interacts with message server(s) 130 to obtain message notifications. The message notifications may indicate that one or more new messages exist that warrant processing and may, possibly, include the contents of the message(s). Notification listener 430 may interact with a notification client, such as a Netscape's PostSMTPAccept plug-in or a COM-based notification client, of message server(s) 130. Scheduler 440 may include logic that manages the operation of poller 420 and notification listener 430 based on user-specified scheduling data.

Messaging protocol client(s) 450 may include logic that interacts with message server(s) 130. For example, messaging protocol client(s) 450 may send messaging protocol commands to and receive protocol responses from message server(s) 130. Message tester 460 may include logic that evaluates whether a particular message matches a profile defined by a receiving party. Message tester 460 may obtain the profile from service setup device 210 and evaluate the message against the profile to determine whether further message processing is needed. The message evaluation may result in the message being sent to call processor 230 for transmission to a receiving party. Alternatively, the message evaluation might result in no further processing of the message.

Message-to-text translator 470 may include logic for translating a message from a source format to a target format, such as an extensible markup language (XML) or raw text. The target format may include one or more of an envelope portion, a message portion, a set of attachments, and audio files. The target format may then later be converted to speech by call processor 230 for delivery to a receiving party.

Figure 5:
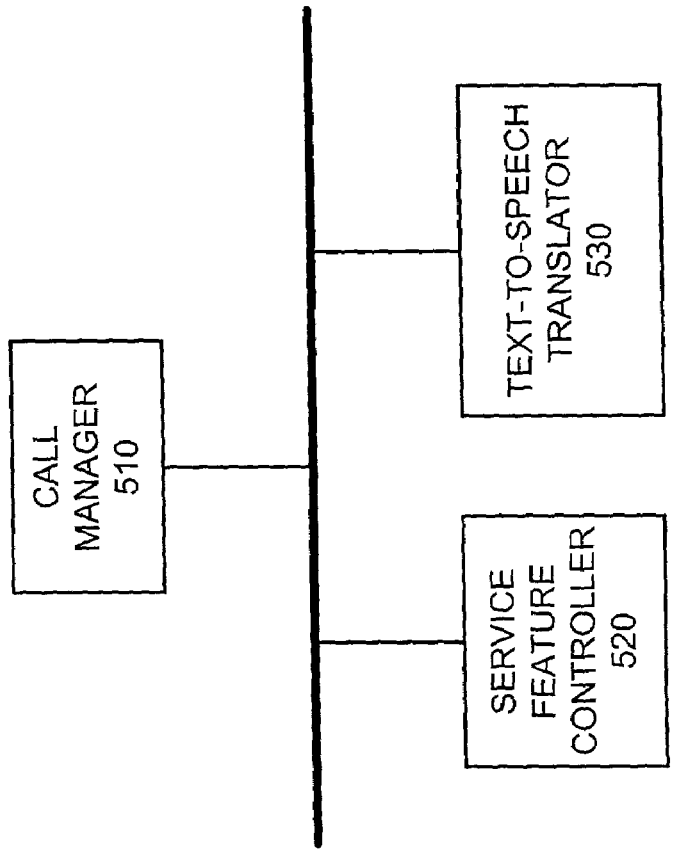
FIG. 5 is an exemplary functional block diagram of the call processor of FIG. 2 according to an implementation consistent with the present invention.

Returning to FIG. 2, call processor 230 may include a computer or a similar device that is capable of initiating a telephony call on behalf of message receiver 220 and interacting with a receiving party during the call. FIG. 5 is an exemplary functional block diagram of call processor 230 according to an implementation consistent with the present invention. Call processor 230 may include call manager 510, service feature controller 520, and text-to-speech translator 530. Call manager 510 may include logic that interacts with user device 120 to notify a receiving party of the presence of an awaiting message. Call manager 510 may perform processing to initiate the signaling necessary to establish a telephony call to user device 120 and interact with the receiving party via user device 120.

Service feature controller 520 may include logic that manages the interaction with user device 120 during execution of the telephony call. Service feature controller 520 may include speech or dual-tone multi-frequency (DTMF) recognition technologies to facilitate interaction with the receiving party via user device 120. Text-to-speech translator 530 may use conventional text-to-speech technologies to convert a text string to audio format. Text-to-speech translator 530 may convert a message in text form (received from message-to-text translator 470 in message receiver 220) to speech for presentation to the receiving party via user device 120.

Exemplary System Processing

Figure 6:
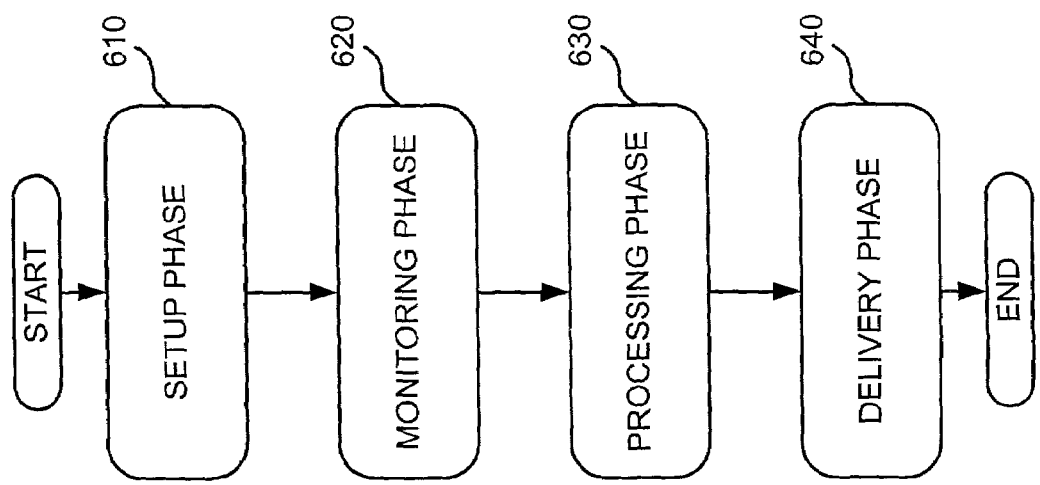
FIG. 6 is a flowchart of exemplary processing by message delivery system of FIG. 2 to facilitate the providing of enhanced message services.

Message delivery system 140 provides enhanced message services. FIG. 6 is a flowchart of exemplary processing by message delivery system 140 to facilitate the providing of enhanced message services. To provide such services, message delivery system 140 may operate according to four phases: setup phase 610; monitoring phase 620; processing phase 630; and delivery phase 640. The operation of message delivery system 140 within each of these phases will be described with regard to FIGS. 7-10.

Figure 7:
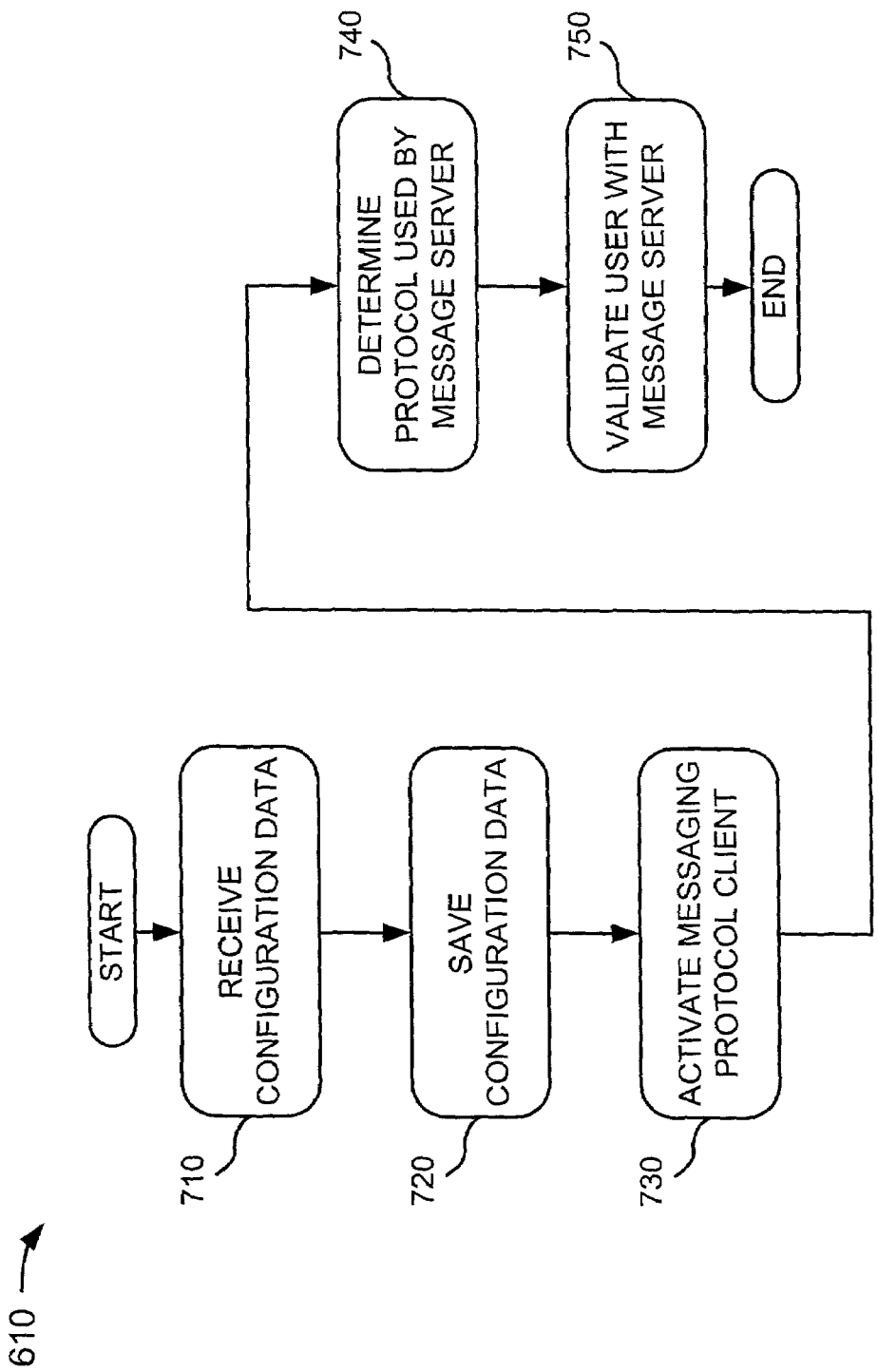
FIG. 7 is a flowchart of exemplary processing by message delivery system of FIG. 2 during the setup phase according to an implementation consistent with the present invention.

During setup phase 610, message delivery system 140 may interact with a user via a configuration device 110 to set up the user's profile. FIG. 7 is a flowchart of exemplary processing by message delivery system 140 during setup phase 610 according to an implementation consistent with the present invention. Processing may begin with a user contacting service setup device 210 to subscribe or register for the enhanced message services offered by message delivery system 140.

For example, the user may use configuration device 110 to dial a telephone number corresponding to service setup device 210 or establish a network connection with service setup device 210 in a conventional manner.

Once a connection has been established, service setup device 210 receives configuration data from the user via configuration device 110 (act 710). The configuration data may include various types of data that facilitates message processing and delivery. For example, the configuration data might include user account information, such as information that identifies a message server 130 (e.g., a network address of message server 130) with which the user has registered or subscribed to obtain messages, a user identification (ID) and password for interacting with message server 130, and authentication data needed to access message content (e.g., DTMF-based personal identification number (PIN) or a spoken password). The configuration data may also include screening data that specifies the conditions that a new message must satisfy to initiate a message notification. The screening data may correspond, for example, to a specific address or name of a sending party, a specific subject, message text, message priority, and/or an interval during which the message arrived at the message server 130.

The configuration data may further include service activation data that specifies the date and time intervals that the service will be active (e.g., check for new messages only between 1 p.m. and 6 p.m.) including recurrence patterns. The configuration data may include call delivery data that specifies, for example, the telephone number for delivery of a telephony call, the date and time to call, and the number of retries to attempt, the retry interval, and/or alternate telephone numbers to try if the call fails (i.e., the line is busy, the call is not answered, or the call is answered by a voice storage device).

After obtaining the configuration data, service setup device 210 may store the data in a persistent memory, such as persistent memory 320 (act 720). The data may be stored according to the user's ID, or in another manner, to facilitate its later retrieval. Service setup device 210 may activate a messaging protocol client 450, for the user, in message receiver 220 (act 730). To accomplish this, service setup device 210 may notify message receiver 220 that a messaging protocol client 450 should be activated.

Messaging protocol client 450 may identify the protocol supported by message server 130 (e.g., Interactive Mail Server Protocol version 4 (IMAP4) or Post Office Protocol version 3 (POP3)) (act 740). For example, messaging protocol client 450 may attempt to connect to the protocol ports of message server 130 using conventional techniques. If messaging protocol client 450 finds that message server 130 supports both IMAP4 and POP3, messaging protocol client 450 may use IMAP4 as the preferred protocol for subsequent interactions with message server 130.

Messaging protocol client 450 may then validate the user ID and password provided by the user with message server 130 (act 750). Messaging protocol client 450 may do this by logging onto message server 130 and checking whether the user ID and password are valid. If the user ID and/or password is invalid, messaging protocol client 450 may report the error back to the user via service setup device 210. Otherwise, messaging protocol client 450 reports to service setup device 210 that both the user ID and password are valid. Service setup device 210 may notify the user of the result and terminate the connection with the user.

Figure 8:
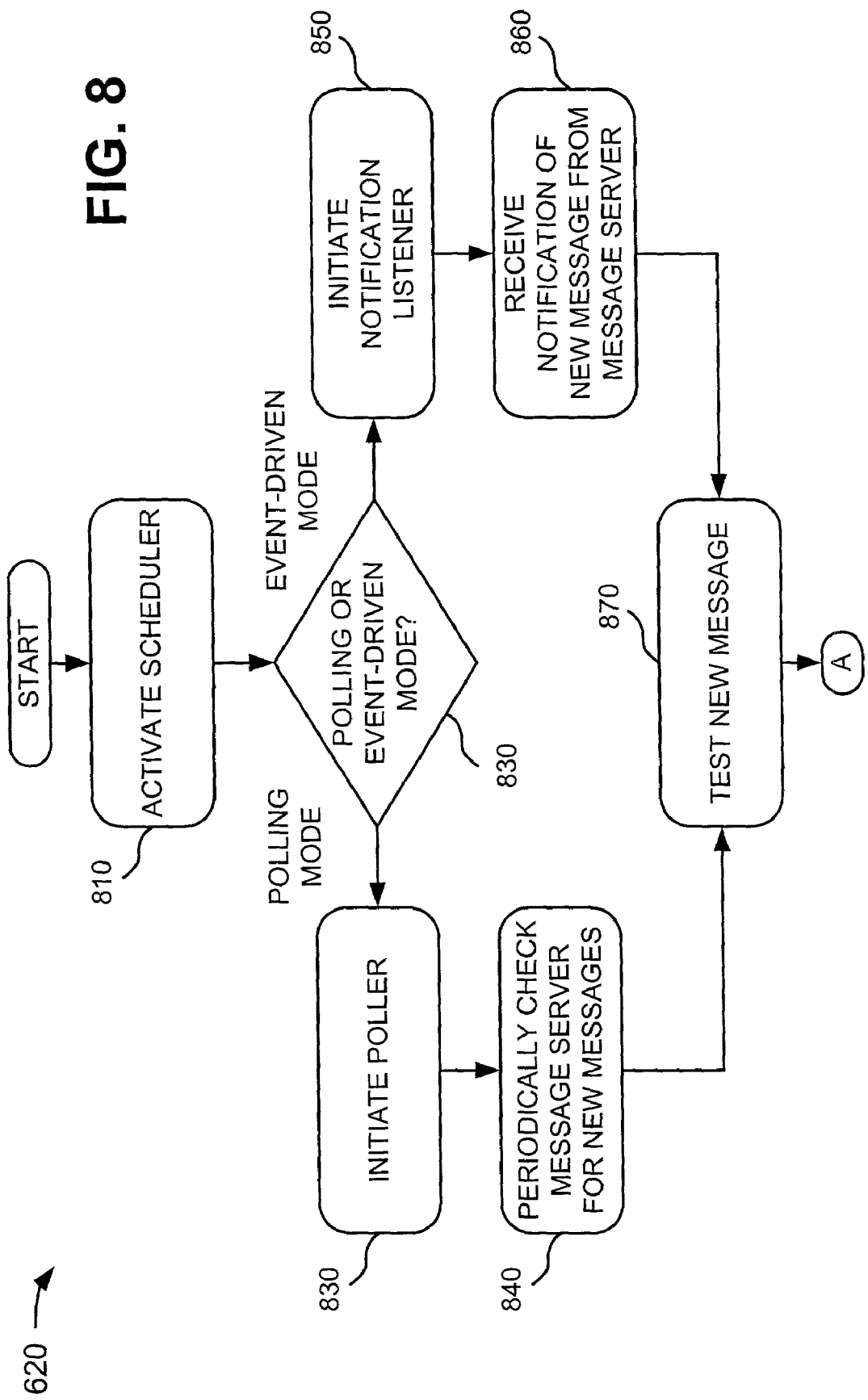
FIG. 8 is a flowchart of exemplary processing by message delivery system of FIG. 2 during the monitoring phase according to an implementation consistent with the present invention.

At the conclusion of setup phase 610, message delivery system 140 may enter monitoring phase 620 during which it monitors a user's mailbox for arrival of a new message. FIG. 8 is a flowchart of exemplary processing by message delivery system 140 during monitoring phase 620 according to an implementation consistent with the present invention. Processing may begin with message receiver 220 activating its scheduler 440 (act 810). Scheduler 440 may interact with service setup device 210 to retrieve the service activation data from the user profile.

Scheduler 440 may then determine whether message delivery system 140 is operating in the polling mode or the event-driven mode (act 820). As described above, the particular mode may be determined by software or may be based on the particular type of message server 130 with which message delivery system 140 is communicating on behalf of a particular user.

If message delivery system 140 is operating in the polling mode, scheduler 440 may initiate poller 420 when indicated by the service activation data in the user profile (act 830). Poller 420 uses messaging protocol client 450 to periodically check message server 130 for new messages (act 840). Alternatively, if message delivery system 140 is operating in the event-driven mode, scheduler 440 may initiate notification listener 430 when indicated by the service activation data in the user profile (act 850). Notification listener 430 waits for notifications from message server 130 indicating the presence of a new message (act 860).

In either event, if a new message exists, message tester 460 tests the message against the user-defined screening data in the user profile (act 870). Depending on the particular protocol used by message server 130, message tester 460 creates an appropriate query to message server 130. For an IMAP4 protocol access, for example, message tester 460 may take advantage of the NMAP4 SEARCH capabilities by generating a query that contains SEARCH criteria based on the screening data.

For a POP3 protocol access, message tester 460 may determine whether message header and/or message body text information is needed for the analyzing the message. For example, if the screening data contains only message header fields, such as From, Subject, or Priority, then message tester 460 need only request message header information from message server 130. If the screening data contains message text keywords, however, then message tester 460 may request the entire message from message server 130.

If the message fails the screening test, processing may end while message delivery system 140 awaits the arrival of the next new message. For example, if the message subject is not the same as the subject defined in the user profile, the message fails the screening test. If the message passes the screening test, however, message delivery system 140 may enter processing phase 630 to process the message and prepare its audible content.

FIG. 9 is a flowchart of exemplary processing by message delivery system 140 during processing phase 630 according to an implementation consistent with the present invention. Processing may begin with message tester 460 determining whether the criteria specified by the call delivery data in the user profile is satisfied (act 910). As described above, the call delivery data may identify, for example, the date and time to initiate the call.

If the call delivery data is not satisfied, then processing may continue until the criteria specified by the call delivery data is satisfied. If the call delivery data is satisfied, messaging manager 410 may use messaging protocol client 450 to retrieve the message from message server 130. For example, messaging protocol client 450 may use conventional techniques to interact with message server 130 and obtain the message.

Messaging manager 410 may then use message-to-text translator 470 to create an envelope, a message, and attachment contents for the message (act 920). The envelope may contain data from the "From," "To," "Subject," and "Date" message header fields. To create the message and attachment contents, message-to-text translator 470 may examine the Multipurpose Internet Mail Extensions (MIME) structure and bodypart headers. Message-to-text translator 470 may perform all necessary conversions, such as decoding of encoded bodyparts, determining whether there are alternative bodyparts, parsing Hypertext Markup Language (HTML) bodyparts, and converting attachments into text. If an attachment is not convertible, message-to-text translator 470 may generate a description of the attached file based on its given content type and/or file name. In the case of facsimile messages, message-to-text translator 470 may use optical character recognition (OCR) technology to convert the facsimile message to text. Messaging manager 410 may then use text-to-speech translator 530 to generate a message audio files set, which is composed of the envelope, message, and attachment contents (act 930). If the original message is a voice mail message, the original voice mail audio file may be included in the message audio files set instead of the converted message content. The messaging manager 410 may store the message audio files set in temporary storage in message receiver 220 or send the message audio files set for later use by call processor 230.

Messaging manager 410 may then pass control to call processor 230. Call processor 230 may invoke call manager 510 for commencement of delivery phase 640 (act 940). FIG. 10 is a flowchart of exemplary processing by message delivery system 140 during delivery phase 640 according to an implementation consistent with the present invention. Processing may begin with call manager 510 initiating a telephony call to a destination address, corresponding to a user device 120, via network 150 (act 1010). Call manager 510 may identify the destination address from the telephone number in the user profile.

Call manager 510 may then determine whether the call fails (e.g., the line is busy, not answered, or answered by a voice storage device) (act 1020). If the call fails, call manager 510 may retry the call a number of times or try an alternate telephone number (act 1030). Call manager 510 may identify the number of times to retry the call or the alternate telephone number(s) to call from the user profile. If the call succeeds, call manager 510 passes control to service feature controller 520. Service feature controller 520 establishes an interactive session with user device 120 to deliver the message(s) (acts 1040 and 1050).

The following is an exemplary session between service feature controller 520 and user device 120. The call arrives at user device 120. The receiving party answers the call using user device 120. Service feature controller 520 may prompt the receiving party for a user ID, PIN, and/or password. The receiving party may interact with service feature controller 520 using DTMF or speech recognition.

Service feature controller 520 may authenticate the receiving party based on information in the receiving party's user profile. Upon successful authentication, service feature controller 520 may deliver the audible message to the receiving party. While listening to the message, the receiving party may interactively choose to listen to and repeat different parts of the message (e.g., envelope, message, and attachment contents). After listening to the message, the receiving party may be given the following options: (1) listen to the message again; (2) discard the message; (3) reply to the message by e-mail or telephony call; (4) forward the message (by telephone or e-mail), possibly with comment; and/or (5) manage service options (e.g., modify the user profile). Once the receiving party finishes, user device 120 may terminate the connection with service feature controller 520.

CONCLUSION

Systems and methods consistent with the present invention provide enhanced message services. A system, consistent with the present invention, initiates a call to a user when a new message arrives that meets some set of user-defined criteria. The user defines his or her preferences as to what causes the call to occur. The message content is then presented to the user as an audio stream in the same call.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6-10, the order of the acts may differ in other implementations consistent with the present invention.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   generating a user profile for a receiving party that includes user-defined criteria and delivery data specified by the receiving party;
   determining that a message and one or more message attachments intended for the receiving party is stored in the receiving party's mailbox, the stored message being in a source message format and the one or more message attachments being in a source attachment format;
   identifying, based on the user-defined criteria first portions of the stored message to be analyzed and second portions of the stored message not to be analyzed;
   requesting only the first portions of the stored message from the receiving party's mailbox;
   analyzing the requested portions of the message with respect to the user-defined criteria to determine whether the message should be delivered to the receiving party based on one or more of the user-defined criteria;
   translating the message from the source message format to message text and the one or more message attachments from the source attachment format into attachment text;
   converting the message text and the attachment text to an audible message when the analyzing determines that the message should be delivered to the receiving party;
   initiating a telephony call to the receiving party at least one of a pre-determined date or time included in the delivery data; and
   delivering the audible message to the receiving party during the telephony call.

2. The method of claim 1, wherein user profile data includes data identifying at least one of a message source, a message type, a message priority, or a message content.

3. The method of claim 1, wherein the determining whether the message should be delivered includes:
   testing the message against the user profile, and
   determining that the message should be delivered when the message passes the test.

4. The method of claim 1, wherein the determining includes:
  monitoring a message server for arrival of new messages intended for the receiving party.

5. The method of claim 4, wherein the monitoring a message server includes:
  periodically checking the message server for new messages.

6. The method of claim 4, wherein the monitoring a message server includes:
  receiving a notification from the message server whenever a new message arrives.

7. The method of claim 1, wherein the converting the message text includes:
  translating the message text into an audible message using a text-to-speech translator.

8. The method of claim 1, wherein the converting the message text includes:
  creating an envelope from at least one of a From, To, Subject, or Date header field corresponding to the message.

9. The method of claim 8, wherein the converting the message text includes:
  translating the message text and the envelope into an audible message.

10. The method of claim 1, wherein the translating the one or more message attachments includes:
  generating a description of the one or more message attachments when the one or more message attachments are not convertible from the source attachment format into the attachment text.

11. The method of claim 10, wherein the converting the message text includes:
  translating the message text and the generated description into an audible message.

12. The method of claim 1, wherein the initiating a telephony call includes:
  determining whether the telephony call reaches the receiving party, and
  retrying the telephony call a predetermined number of times if the telephony call fails to reach the receiving party.

13. The method of claim 1, wherein the initiating a telephony call includes:
  determining whether the telephony call reaches the receiving party, and
  initiating a second telephony call to an alternate telephone number if the telephony call fails to reach the receiving party.

14. The method of claim 1, wherein the delivering the audible message includes:
  authenticating the receiving party based on at least one of a user identifier, a personal identification number, or a password, and
  transmitting the audible message to the receiving party after successful authentication of the receiving party.

15. The method of claim 1, wherein the delivery data specifies a minimum number of messages that are to be delivered to the receiving party before the initiating of the telephony call is performed.

16. The method of claim 1, wherein the initiating a telephony call comprises:
  detecting at least one failed attempt to establish the telephony call, and
  performing, following the at least one failed attempt, a retry of initiating the telephony call up to a maximum number of retries specified by the delivery data.

17. The method of claim 1, wherein the initiating a telephony call comprises:
  failing to establish the telephony call, and
  retrying, after an interval lapses since the failing to establish the telephony call, to initiate the telephony call, wherein the interval is specified by the delivery data.

18. The method of claim 1, wherein the initiating a telephony call comprises:
  calling a first telephone number specified in the delivery data,
  failing to establish the telephony call to the first telephone number, and
  calling a second number specified by the delivery data.

19. A system for presenting a message to a receiving party, comprising:
  means for obtaining a stored user profile corresponding to the receiving party, the user profile comprising delivery data received from the receiving party that specifies at least one of a time or a date of message delivery;
  means for obtaining the message and one or more message attachments intended for the receiving party, the message being obtained in a source message format and the one or more message attachments being obtained in a source attachment format;
  means for requesting from the means for obtaining the message, based on information in the user profile, only some and not other portions of the message to be tested with respect to the user profile;
  means for testing the requested portions of the message with respect to the user profile;
  means for translating the message from the source message format to message text and the one or more message attachments from the source attachment format into attachment text;
  means for converting the message text and the attachment text to an audible message when the message passes the test;
  means for initiating a telephony call to the receiving party at the at least one of the time or the date specified by the delivery data; and
  means for presenting the audible message to the receiving party during the telephony call.

20. A message delivery system, comprising:
  a message receiver configured to:
    determine that a message with one or more message attachments intended for a receiving party is stored in a server, the stored message being in a source message format and the one or more message attachments being in a source attachment format,
    identify, based on user profile data that is maintained for the receiving party, portions of the message where at least some portions of the message are not identified,
    generate a search query based on the identified portions of the message;
    obtain the identified portions of the message from the server, based on the search query for analysis using the user profile data;
    determine whether the message should be delivered to the receiving party based on the analysis of the identified portions,
    convert the message from the source message format to a target format when the analysis determines that the message should be delivered to the receiving party, and
    convert the one or more message attachments from the source attachment format into the target format; and a call processor configured to:
  convert the message from the target format to an audible format, initiate a telephony call to the receiving party at a time that is specified by the receiving party before the message with the one or more message attachments is obtained, and
  deliver the message in the audible format to the receiving party during the telephony call.

21. The system of claim 20, wherein the target format is a text format.

22. The system of claim 20, further comprising:
  a service setup device configured to obtain the user profile data, where the user profile data identifies at least one criterion indicating a time at which messages should be delivered to the receiving party.

23. The system of claim 22, wherein the user profile data includes data identifying at least one of a message source, a message type, a message priority, or a message content.

24. The system of claim 22, wherein when determining whether the message should be delivered, the message receiver is configured to:
  test the message against the user profile data, and
  determine that the message should be delivered when the message passes the test.

25. The system of claim 20, wherein when obtaining a message, the message receiver is configured to:
  monitor a message server for arrival of new messages intended for the receiving party.

26. The system of claim 25, wherein when monitoring a message server, the message receiver is configured to:
  periodically check the message server for new messages.

27. The system of claim 25, wherein when monitoring a message server, the message receiver is configured to:
  receive a notification from the message server whenever a new message arrives.

28. The system of claim 20, wherein when converting the message, the message receiver is configured to:
  create an envelope from at least one of a From, To, Subject, or Date header field corresponding to the message.

29. The system of claim 28, wherein when converting the message, the call processor is configured to:
  translate the envelope into the audible format.

30. The system of claim 20, wherein when converting the message, the call processor is configured to:
  translate the one or more message attachments from the target format into the audible format.

31. The system of claim 20, wherein when converting the one or more message attachments, the message receiver is configured to:
  generate a description of the one or more message attachments when the one or more message attachments are not convertible into the target format.

32. The system of claim 31, wherein when converting the message, the call processor is configured to:
  translate the generated description into the audible format.

33. The system of claim 20, wherein when initiating a telephony call, the call processor is configured to:
  determine whether the telephony call fails, and
  retry the telephony call a predetermined number of times if the telephony call fails.

34. The system of claim 20, wherein when initiating a telephony call, the call processor is configured to:
  determine whether the telephony call reaches the receiving party, and
  initiate a second telephony call to an alternate telephone number if the telephony call fails to reach the receiving party.

35. The system of claim 20, wherein when delivering the message, the call processor is configured to:
  authenticate the receiving party based on at least one of a user identifier, a personal identification number, or a password, and
  transmit the message in the audible format to the receiving party after successful authentication of the receiving party.

36. A computer-readable storage device that stores instructions executable by at least one computer to perform a method for presenting a message to a receiving party, comprising:
  instructions for determining that the message intended for the receiving party is stored in a message server, the stored message including one or more message attachments;
  instructions for requesting from the message server, based on information in a user profile associated with the receiving party, select portions that constitute less than an entirety of the stored message for analysis using the user profile information to determine whether the message is to be converted;
  instructions for determining whether the one or more message attachments are convertible into a target format;
  instructions for translating the one or more message attachments into the target format when the one or more message attachments are convertible into the target format;
  instructions for generating a description of the one or more message attachments when the one or more message attachments are not convertible into the target format;
  instructions for initiating a voice call to the receiving party at a predetermined date and time that is specified by the receiving party before the message is obtained; and
  instructions for presenting the message with the one or more attachments or the generated description to the receiving party during the voice call.

37. The computer-readable medium of claim 36, wherein the instructions for requesting includes:
  instructions for generating a search query based on a protocol used by the message server to obtain the select portions of the message.

38. The computer-readable medium of claim 36, further comprising:
  instructions for interacting with the receiving party to generate the user profile that describes at least one criterion indicating when messages should be delivered to the receiving party.

39. The computer-readable medium of claim 36, further comprising:
  instructions for converting the message from a source format to an audible format.

40. The computer-readable medium of claim 39, wherein the instructions for converting the message includes:
  instructions for translating the message from the source format to the target format, and
  instructions for translating the message from the target format to the audible format.

41. A method for providing message delivery services, comprising:
  prior to monitoring messages, interacting with a user to generate a user profile that identifies at least one message criterion that indicates a date or time when the messages should be delivered to the user;
  monitoring a message server for arrival of new messages intended for the user;

processing the new messages, including:
- identifying, based on the user profile, portions and not an entirety of each of the new messages for analysis using the user profile,
- requesting only the identified portions from the message server,
- determining whether the new messages should be delivered to the user based on the analysis of the requested portions using the user profile,
- translating the new messages from a source format to a text format, and
- converting the new messages from the text format to an audible format, as audible messages, when the analysis determines that the new messages should be delivered to the user; and delivering the audible messages to the user based on the at least one message criterion, including:
- initiating a telephony call to the user at the indicated date or time, and
- presenting the audible messages to the user during the telephony call.

42. The method of claim 41, wherein the interacting with a user includes:
- receiving user identification and password data from the user, and
- validating the user identification and password data with the message server.

43. The method of claim 42, wherein the validating the user identification and password data includes:
- attempting to logon to the message server using the user identification and password data, and
- determining whether the logon is successful.

44. The method of claim 41, wherein the at least one message criterion includes at least one of a message source, a message type, a message priority, or a message content.

45. The method of claim 41, wherein the monitoring a message server includes:
- periodically checking the message server for new messages.

46. The method of claim 41, wherein the monitoring a message server includes:
- receiving a notification from the message server whenever a new message arrives.

47. An automated method for delivering a message having a number of portions to a receiving party, comprising:
- determining that the message intended for the receiving party is stored in a server, the message including a message portion and one or more attachments in a source format;
- identifying, based on information in a user profile associated with the receiving party, portions fewer than each of the number of the message for analysis using the user profile information to;
- requesting only the identified portions of the message from the server and analyzing the requested portions to determine whether the message is to be converted;
- determining whether the one or more attachments can be converted to a target format;
- translating the one or more attachments into the target format when the one or more attachments can be converted to the target format;
- generating a description of the one or more attachments when the one or more attachments cannot be converted to the target format;
- converting the message portion to an audible message;
- initiating a telephony call to a telephony device associated with the receiving party at a pre-determined date and time that is specified by the receiving party before the the message is stored in the server; and
- delivering the audible message and the one or more attachments or the generated description to the receiving party during the telephony call.

48. The method of claim 47, wherein the telephony device includes one of a wireline or wireless communication device.

* * * * *